Patented Feb. 1, 1927.

1,616,323

UNITED STATES PATENT OFFICE.

RUDOLF LIESKE, OF LEVERKUSEN, ALFRED THAUSS, OF COLOGNE-DEUTZ, AND WILHELM BONRATH, OF LEVERKUSEN, NEAR COLOGNE, GERMANY, ASSIGNORS TO WINTHROP CHEMICAL COMPANY, INC., OF NEW YORK, N. Y.

DUSTING POWDER ADHERENT TO PLANTS.

No Drawing. Application filed September 25, 1925, Serial No. 58,654, and in Germany April 3, 1925.

Insecticides in the form of dusting powders, as for example arsenic powder, find extended application in increasing quantities in the extermination of insect pests in horticulture, etc. These substances however possess the great disadvantage that they are easily blown away by the wind or washed off by rain with the result that a renewed application of the dusting powder is soon rendered necessary. Attempts have been made to increase the adhesive properties of such powders by the addition of swelling materials such as molasses, flour, or the like. However these additions have not been successful and they have not found a wide application, since too large quantities are required in order to obtain a coating of even a comparatively low degree of adhesive power.

The present invention deals with the manufacture of dusting powders for use as plant-insecticides, which possess excellent adhesive properties and consists in the addition to the active constituents of small quantities of the crude products (dried in any convenient manner and finely ground), obtainable by the interaction of cellulose or mercerized cellulose and caustic soda with halogenated fatty acids. These products are obtainable by the carrying out of the process disclosed in German Patent No 332,203, patented January 22, 1921. Numerous experiments indicate that very small quantities of these addition products suffice to fix the dusting powder to the various parts of the plant, due to the presence on the plants of moisture, such as dew etc., in such a manner that the dusting powder is not washed off by continued rain.

As an example dusting powders containing arsenic e. g. as calcium arsenate, which is easily washed away by rain, can be rendered adhesive by the addition of ⅓% of the new adhesive material to such an extent that they are no longer displaced by the influence of the weather, which might under other circumstances remove the same from their support. In place of calcium arsenate insoluble copper compounds may be applied in the same manner and with similar results.

The preparation of the reaction products of cellulose or mercerized cellulose and caustic soda and halogenated fatty acids in accordance with German Patent No. 332,203 is substantially as follows:

10 parts by weight of cellulose are wetted with water and treated for about 2 hours with a 30 percent alcoholic solution of caustic soda. After removing the excess of the solution from the treated cellulose, 10 parts by weight of monochloracetic acid dissolved in water are slowly added and the mixture is allowed to stand for about 36 hours at atmospheric temperature. The resulting pulp is slowly stirred with a gradual addition of water until a thick paste results. The surplus alkali is then neutralized and the solution poured into alcohol, whereby a white flaky precipitate is formed. This precipitate is filtered off, dried and pulverized giving a whitish powder which when introduced into hot or cold water swells and gives a limpid viscous solution capable of depositing a film by evaporation. The dried and pulverized product is insoluble in alcohol, acetone, benzene and ether.

Other products formed from other halogenated fatty acids may be made in a similar manner and have similar properties.

We claim:—

1. A dusting powder insecticide comprising an insecticidal material in dry powdered form, and a material comprising a body substantially identical with the reaction product of cellulose and a halogenated fatty acid, said reaction product in the form of its alkali metal salt in dry powdered form being a whitish powder which swells in either hot or cold water giving a limpid viscous solution capable of leaving a film by evaporation and which is insoluble in organic solvents.

2. A dusting powder insecticide comprising an insecticidal material in dry powdered form and the reaction product in dry powdered form, of cellulose, a caustic alkali and a halogenated fatty acid, said reaction product being a whitish powder soluble in water to a limpid viscous solution and insoluble in organic solvents.

3. A dusting powder insecticide, as defined in claim 1, in which the insecticidal material is calcium arsenate.

4. A dusting powder insecticide comprising 97–99% of calcium arsenate and 3–1% of the alkali metal salt of the reaction product of cellulose and a halogenated fatty acid, substantially as described.

In testimony whereof we have hereunto set our hands.

RUDOLF LIESKE.
ALFRED THAUSS.
WILHELM BONRATH.